(12) United States Patent
Spiegel

(10) Patent No.: US 9,268,310 B2
(45) Date of Patent: Feb. 23, 2016

(54) EXTENDED LIFE, TIMED PINGER FOR AIRCRAFT

(71) Applicant: H. Jay Spiegel, Mount Vernon, VA (US)

(72) Inventor: H. Jay Spiegel, Mount Vernon, VA (US)

( * ) Notice: Subject to any disclaimer, the term of this patent is extended or adjusted under 35 U.S.C. 154(b) by 70 days.

(21) Appl. No.: 14/256,253

(22) Filed: Apr. 18, 2014

(65) Prior Publication Data

US 2015/0301151 A1     Oct. 22, 2015

(51) Int. Cl.
| | |
|---|---|
| *G01S 15/06* | (2006.01) |
| *G01S 13/86* | (2006.01) |
| *G04B 47/00* | (2006.01) |
| *G01S 5/18* | (2006.01) |
| *B64D 45/00* | (2006.01) |

(52) U.S. Cl.
CPC . *G04B 47/00* (2013.01); *G01S 5/18* (2013.01); *B64D 45/00* (2013.01); *B64D 2045/0065* (2013.01); *G01S 15/06* (2013.01)

(58) Field of Classification Search
CPC .............. B64C 13/04; B64C 2201/128; B64C 2201/14; B64C 25/44; B64C 2201/042; B64C 2201/123; B64C 25/46; B64C 13/503; B64C 2201/024; B64C 2201/104; B64C 2201/108
See application file for complete search history.

(56) References Cited

U.S. PATENT DOCUMENTS

| | | | |
|---|---|---|---|
| 6,310,547 B1 * | 10/2001 | Parker .................. | G04G 9/0076 340/12.37 |
| 6,366,311 B1 | 4/2002 | Monroe | |
| 6,741,896 B1 | 5/2004 | Olzak et al. | |
| 6,898,492 B2 | 5/2005 | de Leon et al. | |
| 8,005,584 B1 | 8/2011 | Flynn | |
| 8,165,730 B2 | 4/2012 | Winterhalter et al. | |
| 8,669,882 B2 * | 3/2014 | Donaghey .............. | G01D 4/004 340/438 |
| 8,857,368 B2 * | 10/2014 | Huskamp ................ | G01S 15/06 116/210 |
| 2002/0035416 A1 | 3/2002 | De Leon | |
| 2009/0190443 A1 * | 7/2009 | Huizi .................... | G04G 9/0076 368/10 |
| 2009/0319102 A1 | 12/2009 | Winterhalter et al. | |
| 2012/0232746 A1 | 9/2012 | Wiederwohl | |
| 2013/0210297 A1 * | 8/2013 | Maas ........................ | B63C 9/19 441/95 |
| 2013/0253738 A1 | 9/2013 | Fucke | |
| 2014/0094136 A1 * | 4/2014 | Huang .................... | H04W 4/02 455/404.2 |

FOREIGN PATENT DOCUMENTS

| | | | | | |
|---|---|---|---|---|---|
| FR | WO 0153850 | A1 * | 7/2001 | ................ | G01S 5/22 |
| SG | WO 2013088275 | A1 * | 6/2013 | .............. | G01S 1/725 |

* cited by examiner

*Primary Examiner* — James Trammell
*Assistant Examiner* — Demetra Smith-Stewart
(74) *Attorney, Agent, or Firm* — H. Jay Spiegel

(57) ABSTRACT

A system monitors geographical information for location of an aircraft and supplies that information to a sunrise/sunset calculator that feeds location and sunrise/sunset data to a controller. The controller controls operation of a pinger, limiting its hours of operation to save battery power and extend the time period within which the pinger is audible. The hours of operation are pre-programmed to consist of a time range from sunrise to sunset or from a time after sunrise to a time before sunset.

20 Claims, 1 Drawing Sheet

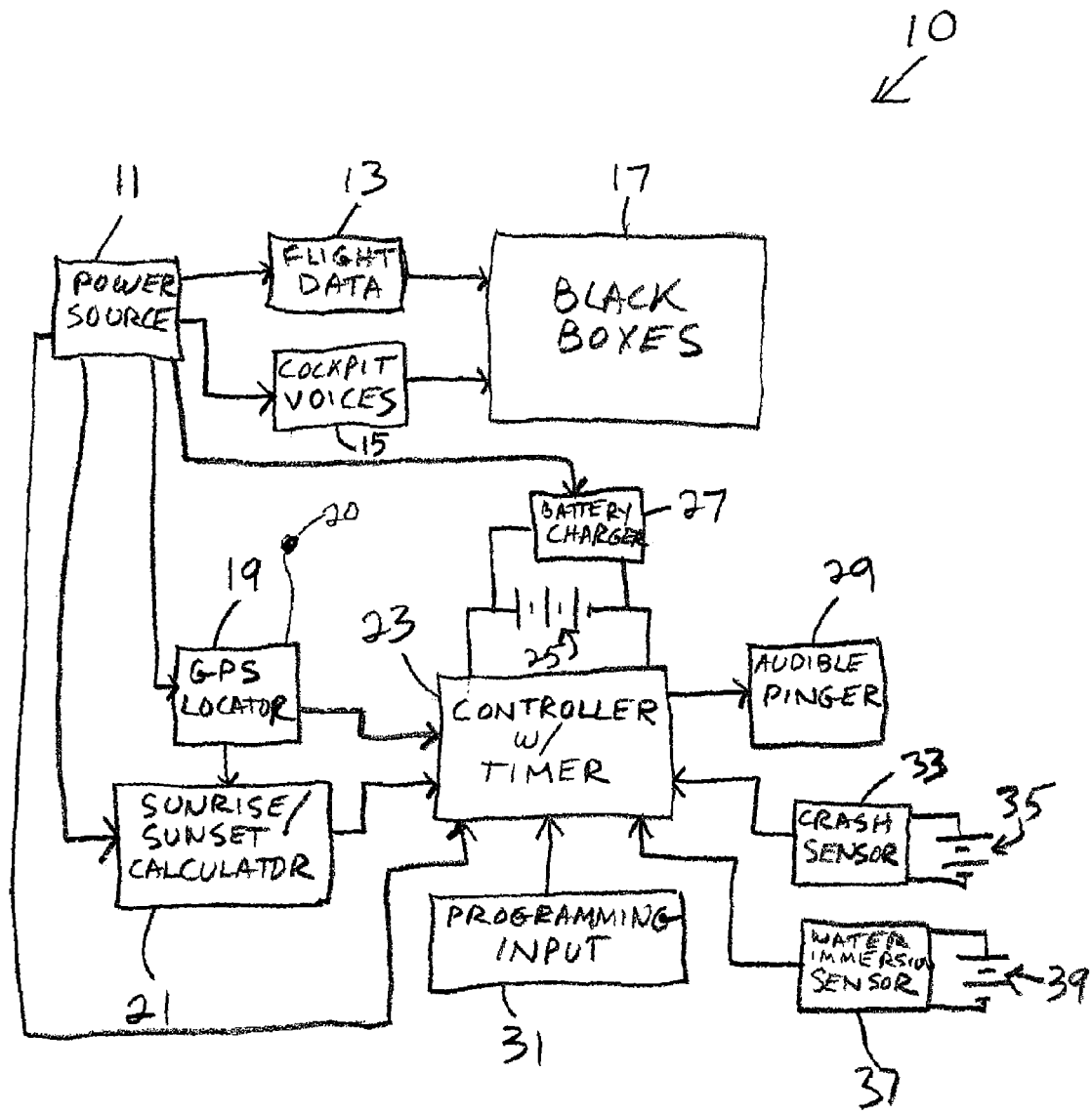

EXTENDED LIFE, TIMED PINGER FOR AIRCRAFT

BACKGROUND OF THE INVENTION

The present invention relates to an extended life, timed pinger for aircraft. On Mar. 8, 2014, about an hour after takeoff, Malaysia Airlines Flight 370 (MH 370) lost contact with air traffic controllers. Such contact was never regained and the flight never arrived at its destination in Beijing, China. A search commenced for the aircraft but numerous possibilities had to be contemplated.

Some scattered data was available to attempt to piece together where the aircraft may have gone including some satellite data periodically transmitted from the Rolls Royce engines of the aircraft. It was soon suspected that the aircraft had crashed into the Indian Ocean, which is a huge body of water more than a dozen times the surface area of the continental United States.

All commercial aircraft are fitted with black boxes that are designed to record flight data and cockpit voices. After an aircraft has crashed, the data from the black boxes must be recovered because it is crucial to an understanding of what precipitated the crash. Typically, these black boxes store the last several hours of data in a rolling fashion with the earlier data being erased as the later data is added. Once a crash occurs and a power supply to the black boxes is terminated, they have an internal power supply, typically one or more batteries, that operate to activate an audible signal such as what is known as a "pinger" which sends out a signal in the form of spaced audible tones and a fixed pre-set frequency. The typical frequency of the acoustic tones from a pinger is 37.5 kHz and, typically, battery life is about 30 days. The pings can be emitted every second or two and can have an initial source level of 160 dB at one meter range which provides a maximum detection range of 2-3 km.

The problem with this typical system for permitting detection of a downed aircraft is that the life of the battery providing operation of the pinger is typically limited to 30 days or so. In the case of flight MH 370, many of those 30 days were lost trying to figure out where it would be appropriate to search for the aircraft. At first, investigators thought the aircraft might be located east of Malaysia. Later, it was suspected that the aircraft had gone west into the Indian Ocean and then either north toward Pakistan or south over the Indian Ocean to a location well west of Australia, mainly somewhat uncharted territory outside the range of any radar surveillance that might have been able to pinpoint its location. While all of these investigations were underway, likely, the pinger on Flight MH 370 was "pinging," draining the battery.

Even with the most modern battery technology, there is a limit to how long a battery may discharge enough energy to power a continuously operating pinger. As such, a need has developed for a system allowing searchers to be able to receive signals from a pinger beyond the usual 30 day lifetime of its battery system. It is with this need in mind that the present invention was developed.

The following prior art is known to Applicant:

U.S. Patents 6,366,311 to Monroe
6,741,896 to Olzak et al.
6,898,492 to de Leon et al.
8,005,584 to Flynn
8,165,730 to Winterhalter et al.

U.S. Published Applications

2002/0035416 to De Leon
2009/0319102 to Winterhalter et al.
2012/0232746 to Wiederwohl
2013/0253738 to FUCKE.

Each of the above-listed references is generally related to black boxes for aircraft but none of them teaches a system for extending the time period within which a pinger on an aircraft is operable.

SUMMARY OF THE INVENTION

The present invention relates to an extended life, timed pinger for aircraft. The present invention includes the following interrelated objects, aspects and features:

(1) In a first aspect, it is known that the time of sunrise and the time of sunset each day varies day-by-day based upon geographic location. As such, with knowledge of the geographic location, it is possible to create data for the precise time of sunrise and sunset for any particular geographic location day-by-day for an extended period of time, in fact, for year after year indefinitely.

(2) Intermatic Inc. of Spring Grove, Ill. manufactures and sells timer mechanisms designed to be used to provide time activation and deactivation of such systems as those that provide landscape lighting for a home or business. In such devices, geographic location data is inputted into the timer and from that location data, the timer accesses data from its memory concerning day-by-day sunrise and sunset times for that specific location. The lighting is activated at dusk each day and deactivated at dawn, events that occur at times that vary day-by-day.

(3) In the present invention, a global positioning system (GPS) locator is provided on an aircraft that continuously monitors the geographic location of the aircraft with respect to the Earth. The GPS locator has an output of this data connected to an input on a sunrise/sunset calculator such as used in an Intermatic Inc. timer such as described above. As such, the sunrise/sunset calculator continually updates the sunrise and sunset times for the location where the GPS locator tells it the aircraft is located. This data is continuously supplied to a controller for an audible pinger which updates the data on an ongoing basis.

(4) The controller may be pre-programmed so that it may activate and deactivate a pinger at times corresponding to a particular time before, at or after sunrise and before, at or after sunset. Typically, searches for downed aircraft occur during daylight hours. Thus, when a pinger is operating on a 24/7 basis, much of its battery power is wasted on pings occurring during time periods when rescuers and searchers are not even working. Thus, the controller may be programmed such that when a crash has occurred and the pinger is to be operated, it is controlled to operate from, for example, 3 hours after sunrise until 3 hours before sunset based upon the sunrise and sunset data provided by the sunrise/sunset calculator. Of course, any combination of starting and stopping times may be employed. For example, the controller can operate the pinger from 2 hours after sunrise to sunset, from sunrise to 2 hours before sunset, or any other desired and/or preferred time range.

(5) The controller is programmed with the same sunrise/sunset data as located within the sunrise/sunset calculator which has been conveyed to the controller as the last conveyed data before power is cut off due to a crash. As such, once the location of the aircraft is fixed resulting from a crash and the controller is going to control operation of the pinger, at that point, the power source for the GPS locator and sunrise/sunset calculator, which is typically the auxiliary power unit (APU) of the aircraft, has ceased operations. Thus, again, the same data located within the controller is set based upon the last data provided to the controller by the sunrise/sunset calculator.

(6) The controller is controlled by its own battery system that is maintained fully charged by a battery charger connected to the APU and operable while the aircraft is in operation. Sensors can detect a crash situation based upon an impact sensor, and a water immersion sensor can detect immersion of the aircraft under water to let the controller know that a crash situation has occurred within a body of water. At that point, the controller accesses the sunrise/sunset data from its memory for the last geographic location data provided by the sunrise/sunset calculator and controls operation of the audible pinger during times of the day with respect to sunrise and sunset as pre-programmed.

The current draw for the controller is extremely small and does not significantly impact battery life. As such, by reducing the time period within which the pinger is operated from 24 hours/day to perhaps 6 hours/day, the length of time the pinger is operable may be significantly extended over the typical 30 day period. Moreover, since rescuers and salvagers can be made aware of the time period within which the pinger is programmed to operate during any given day, they can confine their search efforts to that time frame during any given day.

As such, it is a first object of the present invention to provide an extended life timed pinger for aircraft.

It is a further object of the present invention to provide such a system in which sunrise and sunset data for a location where an aircraft has crashed may be preserved and employed to extend battery life of the pinger.

It is a still further object of the present invention to provide such a system in which operation of a pinger may be controlled so that it only occurs during certain hours of daylight with respect to sunrise and sunset.

It is a still further object of the present invention to provide such a system which will allow rescuers and salvagers significantly more days within which to locate a downed aircraft.

These and other objects, aspects and features of the present invention will be better understood from the following detailed description of the preferred embodiment when read in conjunction with the appended drawing figure.

BRIEF DESCRIPTION OF THE DRAWING

FIG. 1 shows a schematic representation of the present invention.

SPECIFIC DESCRIPTION OF THE PREFERRED EMBODIMENT

With reference to FIG. 1, the inventive system is generally designated by the reference numeral 10. A power source 11 may be an auxiliary power unit (APU). The power source 11 supplies power to permit conveyance of flight data 13 and recording of cockpit voices 15 to black boxes designated by the reference numeral 17. Typically, there are separate black boxes for flight data recording and cockpit voice recording.

The power source 11 also powers a global positioning system (GPS) locator 19 which, with its antenna 20, continuously monitors the geographic location of an aircraft, in which the system 10 is installed and supplies location information to the sunrise/sunset calculator 21 and controller 23. Sunrise/sunset calculator 21 such as found in plug-in timers manufactured by Intermatic Inc. receives the positioning data from the GPS locator 19 and, responsive thereto, continually updates the daily sunrise and sunset times for the location identified by the GPS locator 19 and for at least the next year day-by-day. That data is continually sent to a controller 23 that is powered by a battery 25 and the most recent sunrise/sunset times and location data retained in its memory. The battery 25 is continually maintained at its highest state of charge by a battery charger 27 connected to the power source 11 so long as the power source is operable.

The controller 23 controls operation of an audible pinger 29. Preferably, when operable, the audible pinger sends out "pings" at a frequency of 37.5 kHz. This is the frequency of pings that is being sought by rescuers and salvagers of a downed aircraft. Typically, the pinger 29 emits pings every second or two, about 30-60 pings per minute.

A programming input 31 allows programming of a timer within the controller to time activation and deactivation of the audible pinger 29 with respect to daily sunrise and sunset times.

A crash sensor 33 is powered by the battery 35. A water immersion sensor 37 is powered by the battery 39.

When an aircraft crashes, the power source 11 soon ceases functioning. A conductor 41 connected between the power source 11 and the controller 23 continually informs the controller of the status of operation of the power source 11 and comprises a power outage sensor. Thus, the controller 23 is made aware when the power source 11 ceases functioning. The crash sensor 33 also conveys to the controller 23 when an impact of sufficient strength is sensed to indicate that a crash has occurred. The water immersion sensor 37 sends a signal to the controller 23 when it is immersed in water when an aircraft sinks in a body of water.

Once the controller 23 has been made aware that a crash has occurred, it fixes in its memory the most recent GPS location and sunrise/sunset data that had been received. Based upon the timing information inputted, the controller begins operating the audible pinger 29. At each geographic location, the sunrise and sunset times change day-by-day. This data has been provided to the controller by the sunrise/sunset calculator 21 for the last location sensed by the GPS locator 19 for every day well into the future, at least a year or more.

Thus, for example, if the controller has been programmed to activate the audible pinger 3 hours after sunrise and to deactivate the pinger 3 hours before sunset, these operations are conducted day-by-day for as long as the battery 25 retains enough charge to allow these operations to be performed. For each geographic location, the dates of sunrise and sunset vary day-by-day and anyone searching for an aircraft can gain easy access to this data and, with knowledge of the information programmed by the programming input 31 as to the times of activation and deactivation of the audible pinger with respect to daily sunrise and sunset data, searchers and salvagers can become aware of the time range during any given day at which the audible pinger is operating. In this regard, once the times of activation and deactivation of the pinger have been set, this information is conveyed to the appropriate authorities prior to take-off. If the immersion sensor 37 does not sense immersion, the controller knows the crash has occurred on land. The controller may be pre-programmed so that in the event of a crash on land, a differing range of time for pinger operation may occur. For example, the controller may operate the pinger continuously, from sunrise to sunset or other time ranges as desired.

The controller 23 utilizes much less power than would be required to operate the audible pinger 29 on a continuous 24/7 basis. As such, by limiting the time range, each day, during which an audible pinger is operating, the number of days it will operate can be extended dramatically beyond the now typical 30 days. In fact, multiples of the 30 day period are clearly feasible, thereby giving rescuers/salvagers much more time within which to locate an aircraft.

When this application was filed, reports concerning the MH 370 aircraft are that no more audible pings have been heard over the last number of days. Had the present invention been installed in the Boeing 777 comprising Flight MH 370, those pings would still be audible and well into the future so that the aircraft could more feasibly be located.

In the present invention, the GPS locator 19 may be any typical global positioning system device programmed with location data for the entire Earth. The programming input 31 may be a keyboard or other input device permitting inputting of data into the controller 23. The controller 23 may comprise a small computer programmed with the software necessary to carry out its mission, including ability to receive and store sunrise/sunset data for each geographic location continually into the future and a built-in timer designed to control activation and deactivation of the audible pinger 29 with times of activation and deactivation being adjustable as explained above. The controller must require only extremely low power input.

The inventive system is contained either within one of the black boxes or within its own hermetically sealed crash hardened housing. In either case, the GPS antenna is installed outside the airframe to receive satellite data, and connects to the GPS unit through the housing or black box wall.

As such, an invention has been disclosed in terms of a preferred embodiment thereof which fulfills each and every one of the objects of the invention as set forth hereinabove and provides a new and useful extended life timed pinger for aircraft of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A system mounted on a movable object for controlling an indicator, comprising:
   a) a controller connected to an indicator, the controller controlling activation and deactivation of the indicator;
   b) a position locator, locating position of said object with respect to planet Earth, said position locator supplying data concerning each said position, while said object is moving, to a sunrise/sunset calculator;
   c) said sunrise/sunset calculator programmed with data concerning at least one daily sunrise and sunset time for every geographic location on planet Earth;
   d) said sunrise/sunset calculator supplying said data concerning daily sunrise and sunset times to said controller, said data corresponding to a geographic location of an antenna of said position locator with respect to planet Earth; and
   e) upon stoppage of said object, said controller activating said indicator at a first time at or spaced from a sunrise time received from said calculator for a particular location where said stoppage has occurred, on a particular day and deactivating said indicator at a second time at or spaced from a sunset time received from said calculator for said particular location and day.

2. The system of claim 1, wherein said indicator is an audible indicator.

3. The system of claim 2, wherein said audible indicator is a pinger.

4. The system of claim 3, wherein said pinger emits pings at a frequency of about 37.5 kHz.

5. The system of claim 1, wherein said controller activates said audible indicator plural times per minute.

6. The system of claim 1, wherein said first time is a time at or after said sunrise time.

7. The system of claim 6, wherein said second time is a time on or before said sunset time.

8. The system of claim 7, wherein a programming input is connected to said controller to facilitate programming said first and second times.

9. The system of claim 1, wherein said at least one daily sunrise and sunset time comprises at least one year of daily sunrise and sunset times.

10. The system of claim 1, said system being mounted in an aircraft comprising said movable object.

11. The system of claim 10, further including at least one sensor, said sensor sensing when said stoppage has occurred indicating said aircraft has crashed.

12. The system of claim 11, wherein said at least one sensor is chosen from the group consisting of an impact sensor, a water immersion sensor, and a power outage sensor.

13. The system of claim 11, wherein said at least one sensor comprises an impact sensor, a water immersion sensor, and a power outage sensor.

14. The system of claim 10, wherein said controller is powered by a battery and said battery has a charge maintained by a battery charger powered by an auxiliary power unit of said aircraft.

15. The system of claim 1, wherein said position locator also supplies position data to said controller.

16. A system for controlling a pinger on an aircraft, comprising:
   a) a controller connected to a pinger, the controller controlling activation and deactivation of the pinger;
   b) a Global Positioning System (GPS) position locator, locating position of said aircraft with respect to planet Earth, said position locator supplying data concerning each said position while said aircraft is moving to a sunrise/sunset calculator;
   c) said sunrise/sunset calculator programmed with data concerning a plurality of consecutive daily sunrise and sunset times for every geographic location on planet Earth;
   d) said sunrise/sunset calculator supplying said data concerning daily sunrise and sunset times to said controller, said data corresponding to a geographic location of an antenna of said GPS with respect to planet Earth; and
   e) upon stoppage of said aircraft, said controller activating said pinger at a first time at or spaced from a sunrise time received from said calculator for a particular location where said stoppage has occurred, on a particular day and deactivating said indicator at a second time at or spaced from a sunset time received from said calculator for said particular location and day.

17. The system of claim 16, wherein said controller activates said pinger plural times per minute.

18. The system of claim 16, wherein a programming input is connected to said controller to facilitate programming of times of activation and deactivation of said pinger.

19. The system of claim 18, further including at least one sensor, said sensor sensing when said aircraft has crashed, said at least one sensor being chosen from the group consisting of an impact sensor, a water immersion sensor, and a power outage sensor.

20. The system of claim 16, wherein said controller is powered by a battery and said battery has a charge maintained by a battery charger powered by an auxiliary power unit of said aircraft.

* * * * *